US012696875B2

(12) United States Patent
Sexton

(10) Patent No.: US 12,696,875 B2
(45) Date of Patent: Aug. 4, 2026

(54) LASER-BASED AREA-DENIAL SYSTEM FOR PETS

(71) Applicant: Rodney Sexton, Hesperia, CA (US)

(72) Inventor: Rodney Sexton, Hesperia, CA (US)

( * ) Notice: Subject to any disclaimer, the term of this patent is extended or adjusted under 35 U.S.C. 154(b) by 0 days.

(21) Appl. No.: 19/054,086

(22) Filed: Feb. 14, 2025

(65) Prior Publication Data

US 2025/0255274 A1     Aug. 14, 2025

Related U.S. Application Data

(60) Provisional application No. 63/553,564, filed on Feb. 14, 2024.

(51) Int. Cl.
*A01K 15/02*          (2006.01)
(52) U.S. Cl.
CPC .................................. *A01K 15/023* (2013.01)
(58) Field of Classification Search
CPC ... A01K 15/023; H01S 3/2383; H01S 3/2391; G08B 13/183
See application file for complete search history.

(56) References Cited

U.S. PATENT DOCUMENTS

| | | | | |
|---|---|---|---|---|
| 4,573,465 A * | 3/1986 | Sugiyama | ............. | H01S 3/2383 |
| | | | | 219/121.76 |
| 5,335,626 A * | 8/1994 | Calabrese | ............ | A01K 15/023 |
| | | | | 119/908 |
| 5,349,926 A * | 9/1994 | McCarney | ........... | G05D 1/0022 |
| | | | | 119/859 |
| 5,608,381 A * | 3/1997 | McCarney | ........... | G05D 1/0022 |
| | | | | 340/573.3 |
| 5,642,690 A * | 7/1997 | Calabrese | ............ | A01K 15/023 |
| | | | | 119/908 |
| 10,149,460 B1 * | 12/2018 | Lill | ...................... | A01K 29/005 |
| 2005/0133701 A1 * | 6/2005 | Anderson, II | ....... | A01K 29/005 |
| | | | | 250/221 |
| 2013/0169441 A1 * | 7/2013 | Wilson | ................. | A01K 27/006 |
| | | | | 340/573.3 |
| 2022/0255285 A1 * | 8/2022 | Nicholson | ......... | H01S 3/094046 |

* cited by examiner

*Primary Examiner* — Christopher D Hutchens

(57) ABSTRACT

A laser-based area-denial system includes a dual-wavelength laser emitter having a first laser configured to emit a first laser beam having a wavelength in the Infrared range, a second laser configured to emit a second laser beam having a wavelength in the visible range, and an adjustable focus pattern cap, and a sensor configured to deliver a deterrent stimulus in response to the first laser beam.

3 Claims, 12 Drawing Sheets

LASER-BASED AREA-DENIAL SYSTEM FOR PETS

CROSS REFERENCE TO RELATED APPLICATION

This application claims the benefit of U.S. Provisional Application Ser. No. 63/553,564, filed Feb. 14, 2024, the entirety of which is incorporated by reference herein.

BACKGROUND OF THE INVENTION

Technical Field

Aspects of embodiments of the present disclosure are related to area-denial systems for use with pets. More specifically, aspects of embodiments of the present disclosure are directed to area-denial systems that incorporate laser guide (visible) and control (IR) beams that may be used with one or more collar-mounted sensors.

Commercially available area-denial systems for use with pets have generally tended to be for outdoor use and rely on Infrared (IR) emitters or Radio Frequency (RF) emitters to establish a defined area where pets are allowed. Often, these emitters broadcast signals in an omni-directional, i.e., nearly isotropic, manner outward from the emitter. As such, because there is no focused beam to guide the system, the fine control of such systems is limited. Some other systems have emitters that may produce conical beam shapes, but these are also somewhat limited in the fine control offered because the conical beam width may be fixed or have very limited adjustability.

Many of these systems, even those that use emitters that produce conical beam shapes for their emissions, incorporate a collar with a sensor configured to detect the IR or RF signals and provide a deterrent sensation, such as a shock or vibration, to deter a pet from leaving the defined area. Even for systems intended for indoor use, the indoor volume covered by the IR or RF emitters, based on their omni-directional or conical emission pattern, limits the ability of these systems to be finely controlled and thereby limits the practicality of their use.

There are other area-denial systems that utilize laser light to more narrowly define a boundary that cannot be crossed, but these typically rely on having stationary laser emitters and laser sensors to determine when the beam path has been crossed. Such systems require increased installation time, cost, and maintenance. Moreover, the flexibility of such systems is limited by the size and positioning of the laser sensors.

Finally, there are commercially available area-denial systems that utilize cameras and computer-vision algorithms to create area-denial systems for pets. However, these system require more complex installation and require cameras to be constantly operated within the user's home creating potential privacy issues.

Problems that are to be Solved by the Invention

As described previously, currently available area-denial systems frequently lack the accuracy required for indoor use as they rely on widely broadcast, omni-directional RF or IR signals. Even for such systems that use emitters configured to produce conical beams from the emitters, the systems often lack adjustability. Likewise, because these systems rely on emissions having wavelengths outside of the visible spectrum, there is no visual guide to assist a user in setting them up. Therefore, there is a need for an area-denial system that may be finely controlled to offer the accuracy required for convenient indoor use that also provides a visible guide for users to aid the installation process.

Means for Solving the Problem

Some embodiments of the present disclosure are directed to area-denial systems that utilize dual-wavelength laser emitters that may be used with one or more adjustable focus pattern caps to finely control the emitted beam shape (emission angle and pattern) of the dual-wavelength laser emitters. Some other embodiments of the present disclosure may include sensors configured to be mounted on a pet collar and tuned to deliver a deterrent stimulus (shock, vibration, noise) in response to receiving a signal from one or more of the dual-wavelength laser emitters. The use of finely controllable laser beams having different wavelengths may, in some embodiments, allow for the accurate designation of areas to be restricted to pets in the indoor setting and provide a simple and effect visual aid to ease the installation process.

Effect of the Invention

Some embodiments of the present disclosures may provide a laser-based area-denial system that may be accurately used indoors and that may also provide a simplified installation process by including a visual guide to a user during setup. After installation, some embodiments may also provide a quick visual check for the areas designated for restriction by the system by allowing a user to turn on the visible laser to see how the beams are directed.

SUMMARY OF THE INVENTION

One or more embodiments of the present disclosure may be directed to a laser-based area denial system.

A laser-based area-denial system includes a dual-wavelength laser emitter having a first laser configured to emit a first laser beam having a wavelength in the Infrared range, a second laser configured to emit a second laser beam having a wavelength in the visible range, and an adjustable focus pattern cap, and a sensor configured to deliver a deterrent stimulus in response to the first laser beam.

The laser-based area-denial system may include a collar configured to be coupled to the sensor.

The laser-based area-denial system may have the adjustable focus pattern cap be configured to adjust a dispersion angle of the first laser beam.

The laser-based area-denial system may have the adjustable focus pattern cap be configured to adjust a dispersion angle of the second laser beam.

The laser-based area-denial system may have the dual-wavelength laser emitter further include a microcontroller having a processing unit, a memory, and a wireless communications module.

The laser-based area-denial system may have the first laser and the second laser be configured to be controlled by the microcontroller.

The laser-based area-denial system may have the wireless communications module be configured to receive signals from a remote control.

A multi-pet laser-based area-denial system includes a dual-wavelength laser emitter having a first laser configured to emit a first laser beam having a wavelength in the Infrared range, a second laser configured to emit a second laser beam having a wavelength in the visible range, a microcontroller having a processing unit, a memory, and a wireless communications module configured to control the first laser and the second laser, and an adjustable focus pattern cap, and a collar-mounted sensor having a collar, and a sensor-controller configured to couple to the collar and having a sensor processing unit, a sensor memory, a sensor wireless communications module, and a stimulus module configured to be controlled by the sensor processing unit and deliver a deterrent stimulus in response to the first laser beam.

The multi-pet laser-based area-denial system may have the microcontroller be configured to store one or more signal patterns in the memory and cause the first laser to emit the first laser beam according to the one or more signal patterns.

The multi-pet laser-based area-denial system may have the sensor-controller be configured to active the stimulus module in response to receiving the first laser beam emitted in a signal pattern corresponding to one or more of the signal patterns stored in the memory.

The multi-pet laser-based area-denial system may have a first signal pattern of the one or more signal patterns stored in the memory correspond to a first pet.

The multi-pet laser-based area-denial system may have a second signal pattern of the one or more signal patterns stored in the memory correspond to a second pet.

The multi-pet laser-based area-denial system may further include a remote control configured to emit a remote signal wherein the sensor-controller is configured to activate the stimulus module in response to the remote signal.

A focus-adjustable laser-based area-denial system includes a dual-wavelength laser emitter having a first laser configured to emit a first laser beam having a wavelength in the Infrared range, a second laser configured to emit a second laser beam having a wavelength in the visible range, a microcontroller having a processing unit, a memory, and a wireless communications module configured to control the first laser and the second laser, and an optical path assembly, and a collar-mounted sensor having a collar, and a sensor-controller configured to couple to the collar and having a sensor processing unit, a sensor memory, a sensor wireless communications module, and a stimulus module configured to be controlled by the sensor processing unit and deliver a deterrent stimulus in response to the first laser beam.

The focus-adjustable laser-based area-denial system may have the optical path assembly be a dichroic mirror optical path assembly.

The focus-adjustable laser-based area-denial system may have the optical path assembly be a slide-adjustable optical path assembly.

The focus-adjustable laser-based area-denial system may have the optical path assembly be a flip-adjustable optical path assembly.

The focus-adjustable laser-based area-denial system may have the optical path assembly be an independently adjustable optical path assembly.

The focus-adjustable laser-based area-denial system may further include a wireless base station configured to wirelessly interface with the wireless communications module of the dual-wavelength laser emitter.

The focus-adjustable laser-based area-denial system may have the wireless base station be further configured to wirelessly interface with the sensor wireless communications module of the sensor-controller.

BRIEF DESCRIPTION OF THE DRAWINGS

The features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

Figure 1:
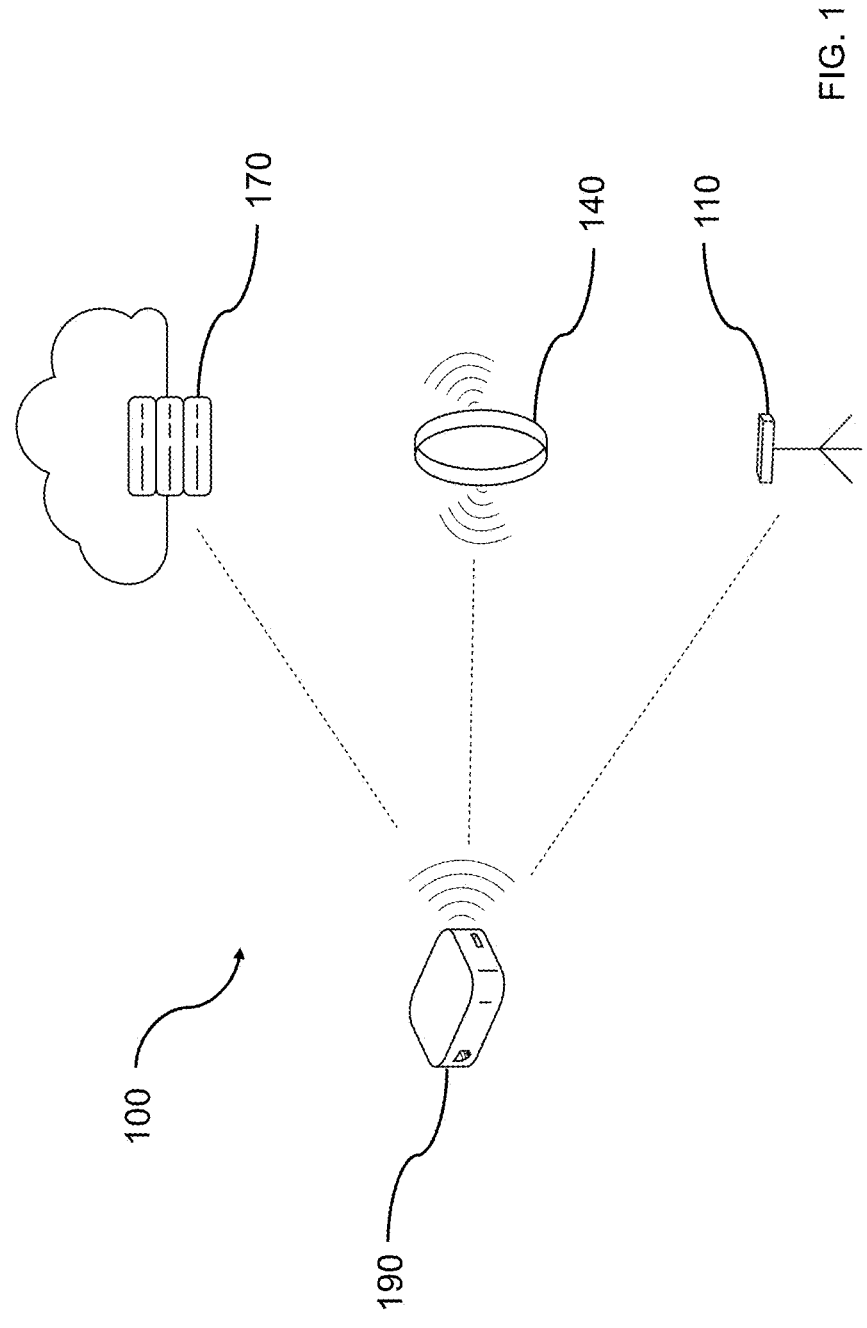
FIG. 1 is a simplified diagram depicting a laser-based area-denial system, according to aspects of embodiments of the present disclosure.

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer, or section. Thus, a first element, component, region, layer, or section described below could be termed a second element, component, region, layer, or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

I. Laser-Based Area-Denial System

One or more embodiments according to the present disclosure will now be described. As described previously, there is a need for a system that may be easily set up and adjusted by a user that allows for the controlled exclusion/denial of areas like furniture, counter tops, doorways, etc. from pets. During use, it is advantageous if the system offers control over the size of the area being denied to one or more pets, but that is also unobtrusive for the user.

Accordingly, some embodiments of the present disclosure are directed to laser-based area-denial systems that may provide a deterrent stimulus to one or more pets when the pets enter a designated denial area (also referred to herein as an "activation zone.")

Figure 2:
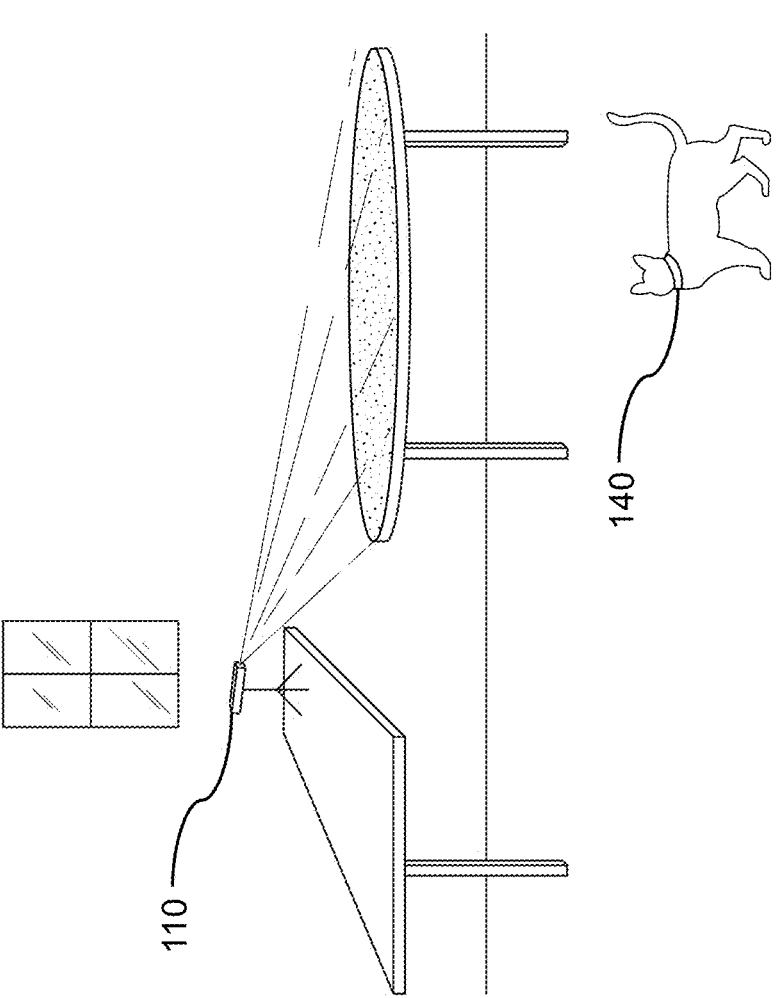
FIG. 2 is a perspective view of a laser-based area-denial system in an inactivated state, according to aspects of embodiments of the present disclosure.
Figure 3:
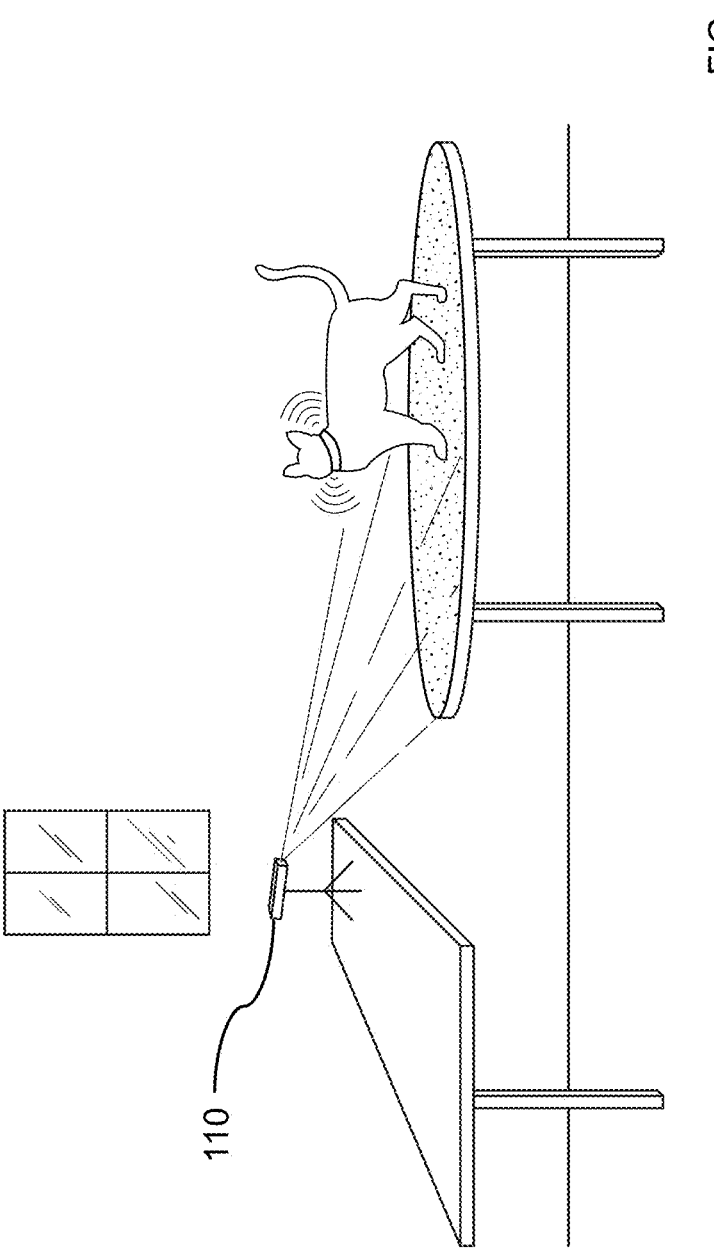
FIG. 3 is a perspective view of a laser-based area-denial system in an activated state, according to aspects of embodiments of the present disclosure.

Further understanding of the operation of some embodiments of the present disclosure may be had by reference to FIGS. 1-3.

FIG. 1 is a simplified diagram depicting a laser-based area-denial system, according to aspects of embodiments of the present disclosure. As depicted, some embodiments of a laser-based area-denial system 100 of the present disclosure may include a dual-wavelength laser emitter 110, a sensor 140 (depicted herein coupled to a collar). In some embodiments, one or more dual-wavelength laser emitters may be used. Similarly, in some embodiments, one or more sensors may be used. In some such embodiments, a plurality of sensors may be used within the laser-based area-denial system with each sensor corresponding to a different pet. Such embodiments, referred to herein as "multi-pet" embodiments will be described in detail below. Some other embodiments may also include a wireless base station 190 that may be configured to wirelessly interface with one or more dual-wavelength laser emitter and/or one or more sensors and also connect via a network connection to a remote or cloud-based server 170 to record and track information related to the timing and frequency of area denials associated with the system during use. Such app-enabled embodiments will be discussed in detail below.

In some embodiments, during use, a dual-wavelength laser emitter of the present disclosure may be positioned and adjusted to direct a beam of laser light onto a surface such as, but not limited to, a tabletop, counter, or doorway. During setup, a visible wavelength of laser light may be used to provide a user with a visual guide to the area being designation by the system for exclusion/denial. Once set up, in some embodiments, the dual-wavelength laser emitter may be configured to emit an infrared (IR) laser beam along the same, or substantially the same, pattern and beam-dispersion angle as the visible laser used during setup. Subsequently, in some embodiments, when a sensor (typically coupled to a collar on a pet) enters the denied area covered by the IR laser beam, i.e., the "activation zone," the sensor may produce a stimulus in response to receiving the IR laser light. The stimulus may, in some such embodiments, serve as a deterrent to pets that enter the activation zone and cause them to retreat from it. Examples of this type of operation, for some embodiments, may be seen in FIGS. 2 and 3.

FIG. 2 is a perspective view of a laser-based area-denial system in an inactivated state, according to aspects of embodiments of the present disclosure. As depicted, a dual-wavelength laser emitter is directing a pattern of laser light onto a tabletop surface. This designates the tabletop as an "activation zone." A user's pet cat wearing a sensor is outside of the activation zone, and the sensor is correspondingly not producing a stimulus, i.e., it is in an "inactivated" state.

FIG. 3 is a perspective view of a laser-based area-denial system in an activated state, according to aspects of embodiments of the present disclosure. As shown, the user's pet cat wearing the sensor on its collar has now climbed onto the surface of the tabletop. Being in the "activation zone," the sensor being worn by the cat is receiving the laser light emitted by the dual-wavelength laser emitter. The sensor receiving the laser light emitted from the dual-wavelength laser emitter causes the senor to enter an "activated" state, i.e., produce a stimulus (depicted here as vibration waves emitting from the sensor). The stimulus may be unpleasant and/or surprising for the user's pet cat and thus cause it to retreat from the designated activation zone.

Additional description of the components of embodiments of the laser-based area denial system of the present disclosure is provided below and other embodiments including those configured for use with multiple pets, that have wireless connectivity to transmit data to a remote or cloud-based server, and embodiments that include a remote control are also described below.

A. Dual-Wavelength Laser Emitters

As described above, some embodiments of the present disclosure may include one or more dual-wavelength laser emitters 110. Further understanding of embodiments of the dual-wavelength laser emitters of the present disclosure may be had by reference to FIG. 4.

Figure 4:
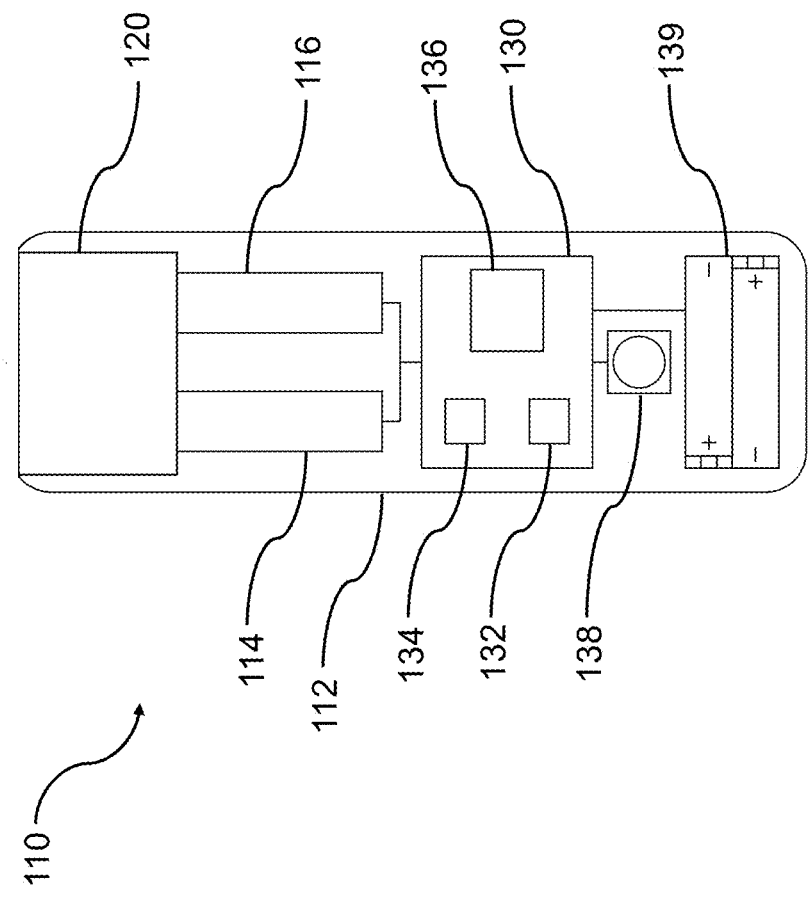
FIG. 4 is a simplified diagram depicting a dual-wavelength laser emitter, according to aspects of embodiments of the present disclosure.

FIG. 4 is a simplified diagram depicting a dual-wavelength laser emitter, according to aspects of embodiments of the present disclosure. As depicted, in some embodiments, the dual-wavelength laser emitters 110 of the present disclosure may include a housing 112, a first laser 114 configured to emit a laser beam having a wavelength in the infrared (IR) range, a second laser beam 116 configured to emit a laser beam in the visible spectrum range, an optical path assembly 120, a microcontroller 130 having a processing unit 132, a memory 134, and a wireless communications module 136, a control input 138 (also referred to herein as an "input"), and a battery 139. As will be understood by one skilled in the art, in some embodiments, the components described herein may be communicably linked to one another using a power bus, a communication bus, or any other bus structure capable of delivering power and or control signals as would be known to one skilled in the art to be suitable for this purpose. All such bus structures as would be known to be suitable for this use by one skilled in the art are within the scope of the present disclosure.

Some embodiments of the components of some embodiments of the dual-wavelength laser emitters of the present disclosure are described in detail below.

i. Lasers

As described previously, some embodiments of the present disclosure may include a first laser 114 configured to emit a laser beam in the IR range (approximately 750 nanometers to 1 millimeter wavelength) and a second laser 116 configured to emit a laser beam in the visible spectrum range (approximately 380 to 750 nanometers wavelength).

In some embodiments, the first laser and the second laser may be operated independently of the operation of each other. In some other embodiments, the first laser and the second laser may be configured to operate, i.e., emit a laser beam, in modes where both the first laser and the second laser are not emitting, the first laser is emitting and the second laser is not emitting, or the first laser is not emitting and the second laser is emitting. In some other embodiments, both the first laser and the second laser may be configured to operate at the same time. As will be understood by one skilled in the art, in some embodiments, the second laser configured to emit a laser beam in the visible spectrum range may be used to help a user get a visual representation of the area covered by the dual-wavelength laser emitter when active, i.e., project a visual representation or "guide" of the activation zone upon a surface or within a volume of a room/area. As a non-limiting example, a green laser may be used to provide a readily visible laser beam for most users. After being set up, and in use for area denial, some embodiments of the present disclosure may use only the IR laser beam to provide coverage of the desired activation zone without shining a bright visible laser that may be intrusive or bothersome for some users.

As will be appreciated by one skilled in the art, there are a number of different lasers, in the IR and visible spectrum ranges, that may be used within the scope of the present disclosure. As a non-limiting example, for the first laser, in some embodiments a diode laser may be used. Diode lasers may, in some embodiments, provide robust and efficient first laser within the dual-wavelength laser emitters of the present disclosure. As another non-limiting example, for the second laser, diode lasers or solid-state lasers such as a diode-pumped solid-state (DPSS) laser having a 532 nm wavelength.

ii. Adjustable Focus Pattern Caps

In some embodiments, one or more adjustable focus pattern caps may be used. The adjustable focus pattern caps of the present disclosure may, in some embodiments, include one or more lens and/or one or more diffraction gratings to produce an adjustable angular beam spread or emission pattern of the columnated laser light entering the adjustable focus pattern caps. In some embodiments, the angular spread/dispersion of the emitted beam, i.e., the "focus," may be adjusted by rotating the adjustable focus pattern caps. In some such embodiments, this may cause the adjustable focus pattern cap to move along a threaded length allowing for a variation in the distance between the components of the adjustable focus pattern caps that correspondingly varies the angular spread/dispersion of the emitted beam.

As will be understood by one skilled on the art, embodiments of the present disclosure may provide more accurate and/or simplified use if the angular spread/dispersion of the IR laser beam emitted from the first laser corresponds to the same, or nearly the same, angular spread/dispersion of the visible laser beam shown during the set up process of the dual-wavelength laser emitter. Accordingly, some embodiments of the dual-wavelength laser emitters of the present disclosure include an optical path assembly to facilitate such functionality. Some embodiments of the optical path assembly of the present disclosure are described in detail below.

iii. Optical Path Assemblies

In some embodiments of the optical path assembly of the present disclosure, one or more optical components may be used to project the IR laser beam of the first laser along the same axis/path as the visible laser beam of the second laser. A non-limiting example of such an embodiment may be understood by reference to FIG. 5.

Figure 5:
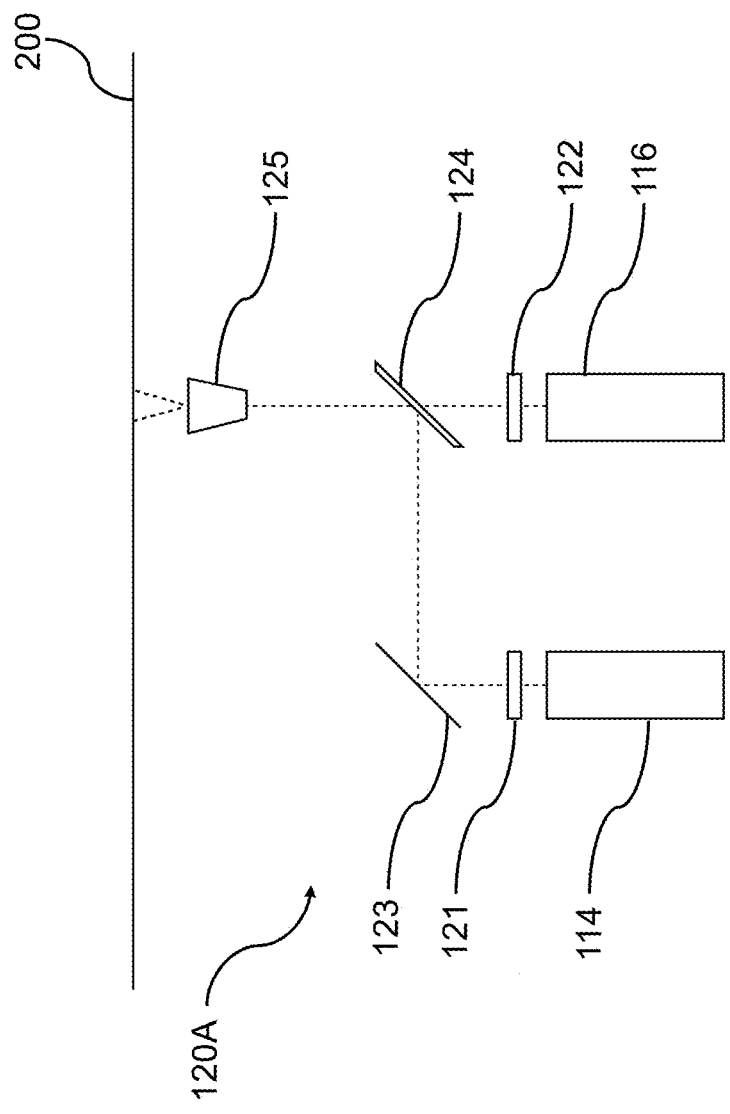
FIG. 5 is simplified diagram depicting a dichroic mirror embodiment of an optical path assembly of a dual-wavelength laser emitter, according to aspects of embodiments of the present disclosure.

FIG. 5 is simplified diagram depicting a dichroic mirror embodiment of an optical path assembly of a dual-wavelength laser emitter, according to aspects of embodiments of the present disclosure. As depicted, in some embodiments a first laser 114 configured to emit laser light in the IR range may be used alongside a second laser 116 configured to emit light in the visible spectrum range. In some embodiments, a first beam-width adjuster 121 may be configured to adjust the width of the IR laser beam. In some other embodiments, a second beam-width adjuster 122 may be used to adjust the beam width of the visible laser beam. As will be understood by one skilled in the art, in some embodiments, it may be useful to configure the optical path assembly to have the same or nearly the same beam widths for the IR laser beam and the visible laser beam. Any suitable beam-width adjuster configuration as would be known to one skilled in the art may be used within the scope of the present disclosure. As a non-limiting example, this includes beam-width adjusters that include two lenses spaced according to their focal lengths to produce a width adjusted output of columnated light.

As depicted in some embodiments, referred to herein as "dichroic mirror embodiments," one or more mirrors may be used to co-align the IR laser beam and the visible laser beam within the optical path assembly before the laser beams reach an adjustable focus pattern cap 125. In some embodiments, an IR-beam mirror 123 may be used to redirect the IR laser beam toward the path of the visible laser beam. In some other embodiments, a dichroic mirror 124 may be configured to allow the visible laser to pass through it along its original path while reflecting the IR laser beam along a path that is co-aligned with the visible laser's path. As will be understood by one skilled in the art, the positional and angular alignment of the IR-beam mirror and the dichroic mirror may be varied according to the specific configuration desired by a user. However, as a non-limiting example, some embodiments may place the IR-beam mirror and the dichroic mirror at 45° angles relative to the incoming beam paths for the laser beams to facilitate effective beam co-alignment using the dichroic mirror. As will also be understood by one skilled in the art, any material or process of manufacturing as would be known to be suitable for the IR-beam mirror and the dichroic mirror may be used within the scope of the present disclosure. In some embodiments, the material used for the IR-beam mirror may be selected according to the materials reflectivity for the specific wavelength of the first laser. Similarly, in some other embodiments, the material(s) used for the dichroic mirror may be determined by the specific pass-through and reflection wavelength ranges needed to match the IR laser's wavelength and the visible laser's wavelength, respectively.

In some embodiments, an optical path assembly cover 200 may be included to allow laser light to pass out from the optical assembly while enclosing the optical path assembly to prevent dust and other substances from obstructing the intended operation of the optical path assembly. Any material known by one skilled in the art to be suitable for this purpose may be used within the scope of the present disclosure. This may include, but is not limited to, glass, tempered glass, transparent or tinted plastic compounds, and any combination of such materials including those having one or more layers of different materials.

The optical path assembly of the present disclosure may, in some embodiments, include one or more adjustable components configured to interface with one or more adjustable focus pattern caps to facilitate a similar angular dispersion of both the IR laser beam and the visible laser beam. Non-limiting examples of such embodiments may be understood by reference to FIGS. 6 and 7.

Figure 6:
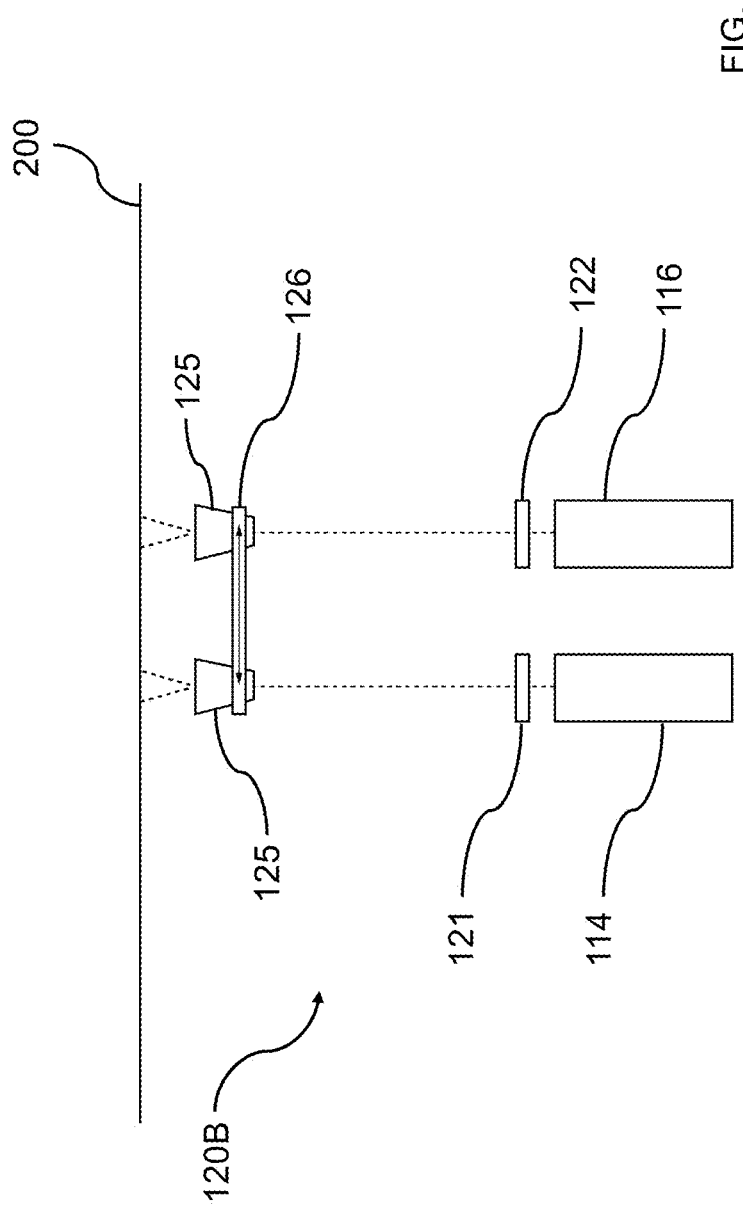
FIG. 6 is simplified diagram depicting a slide-adjustable embodiment of an optical path assembly of a dual-wavelength laser emitter, according to aspects of embodiments of the present disclosure.

FIG. 6 is simplified diagram depicting a slide-adjustable embodiment of an optical path assembly of a dual-wavelength laser emitter, according to aspects of embodiments of the present disclosure. As depicted, in some embodiments, a first laser 114 may be used alongside a second laser 116, wherein the first laser is configured to emit a laser beam in the IR wavelength range and the second laser is configured to emit a laser beam in the visible wavelength range. In some embodiments, a first beam-width adjuster 121 may be used to adjust the size of the emitted IR laser beam. In some other embodiments, a second beam-width adjuster 122 may be used to adjust the beam width of the visible laser.

To facilitate matching, or nearly matching, adjustment of the angular dispersion of the IR laser beam and the visible laser beam by a pair of adjustable focus pattern caps 125, an adjustment slider 125 may, in some embodiments, be configured to interface with and adjust the pair of adjustable focus pattern caps according to the later positioning, i.e., sliding, of the adjustment slider along its range of motion. Such embodiments may be referred to herein as "slide-adjustable" embodiments. In some such embodiments, the adjustment slider may be coupled to the pair of adjustable focus pattern caps and interface with them along a plurality of threads configured to rotate the adjustable focus pattern caps according to the movement of the adjustment slider. In some other embodiments, the adjustment slider may interface with the adjustable focus pattern caps using a plurality of grooves, teeth, and/or ridges, or any other combination of structures as would be known to one skilled in the art to be suitable for this purpose.

In some embodiments, an optical path assembly cover 200 may be included to allow laser light to pass out from the optical assembly while enclosing the optical path assembly to prevent dust and other substances from obstructing the intended operation of the optical path assembly. Any material known by one skilled in the art to be suitable for this purpose may be used within the scope of the present disclosure. This may include, but is not limited to, glass, tempered glass, transparent or tinted plastic compounds, and any combination of such materials including those having one or more layers of different materials.

Figure 7:
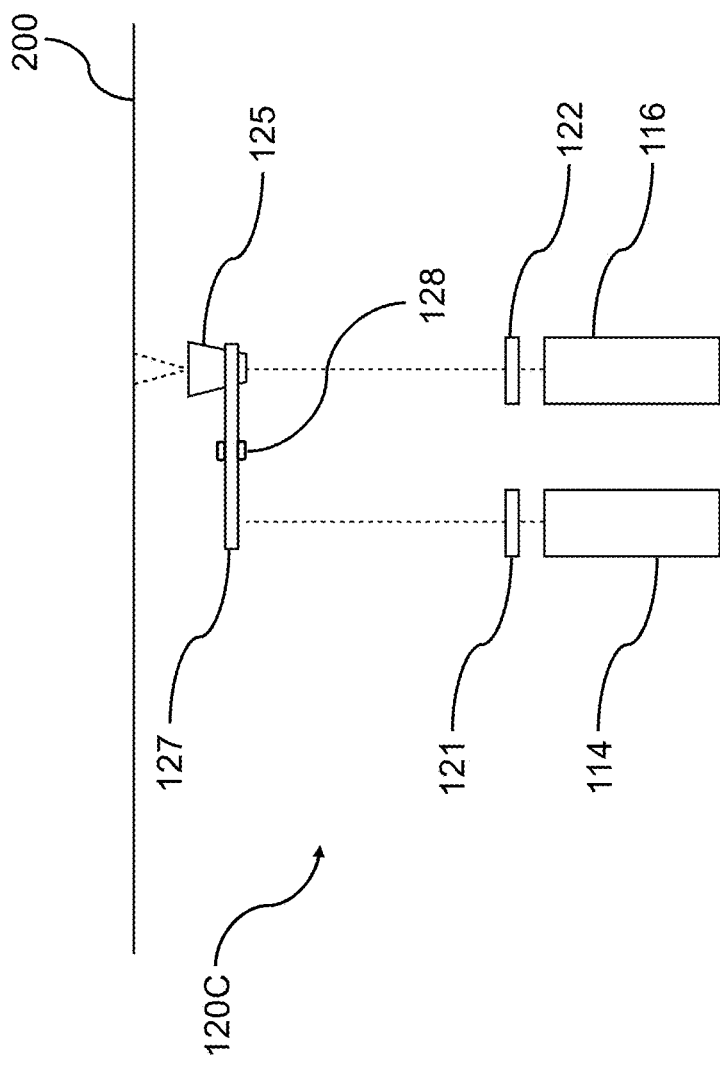
FIG. 7 is simplified diagram depicting a flip-adjustable embodiment of an optical path assembly of a dual-wavelength laser emitter, according to aspects of embodiments of the present disclosure.

FIG. 7 is simplified diagram depicting a flip-adjustable embodiment of an optical path assembly of a dual-wavelength laser emitter, according to aspects of embodiments of the present disclosure. In some embodiments, the optical path assembly may include a rotatable arm 127 configured to rotate about a fixed axis 128 and further configured to couple to and position an adjustable focus pattern cap 125. Such embodiments may be referred to herein as "flip-adjustable" embodiments. As will be understood by one skilled in the art, the material composition and sizing of the rotatable arm may be varied according to the configuration of the other components of the optical path assembly. In some embodiments, the fixed axis may include a post or other structure. In some other embodiments, the fixed axis may include one or more bearings. In some embodiments, the rotatable arm may include one or more retaining components to hold the arm in a set position during use. As a non-limiting example, one or more detents may be used to hold the rotatable arm in a desired position that selectively places the adjustable focus pattern cap in alignment with the IR laser beam or the visible laser beam.

As will be understood by one skilled in the art, the flip-adjustable embodiments may allow a user to position the adjustable focus pattern cap in alignment with the visible laser beam during the set up process of the dual wavelength laser emitter, and then "flip" the adjusted adjustable focus pattern cap to be aligned with the IR laser beam during use. This may, in some embodiments, allow a user to adjust the angular dispersion of the visible laser according to his or her needs and then maintain the setting of the adjustable focus pattern cap for use with the IR laser once ready for use.

In some embodiments, an optical path assembly cover 200 may be included to allow laser light to pass out from the optical assembly while enclosing the optical path assembly to prevent dust and other substances from obstructing the intended operation of the optical path assembly. Any material known by one skilled in the art to be suitable for this purpose may be used within the scope of the present disclosure. This may include, but is not limited to, glass, tempered glass, transparent or tinted plastic compounds, and any combination of such materials including those having one or more layers of different materials.

Some other embodiments of the optical path assembly of the present disclosure may allow for independent adjustment of the angular dispersion of the IR laser beam and the visible laser beam. Such embodiments may be referred to as "independently adjustable" embodiments. Further understanding of such embodiments may be had by reference to FIG. 8.

Figure 8:
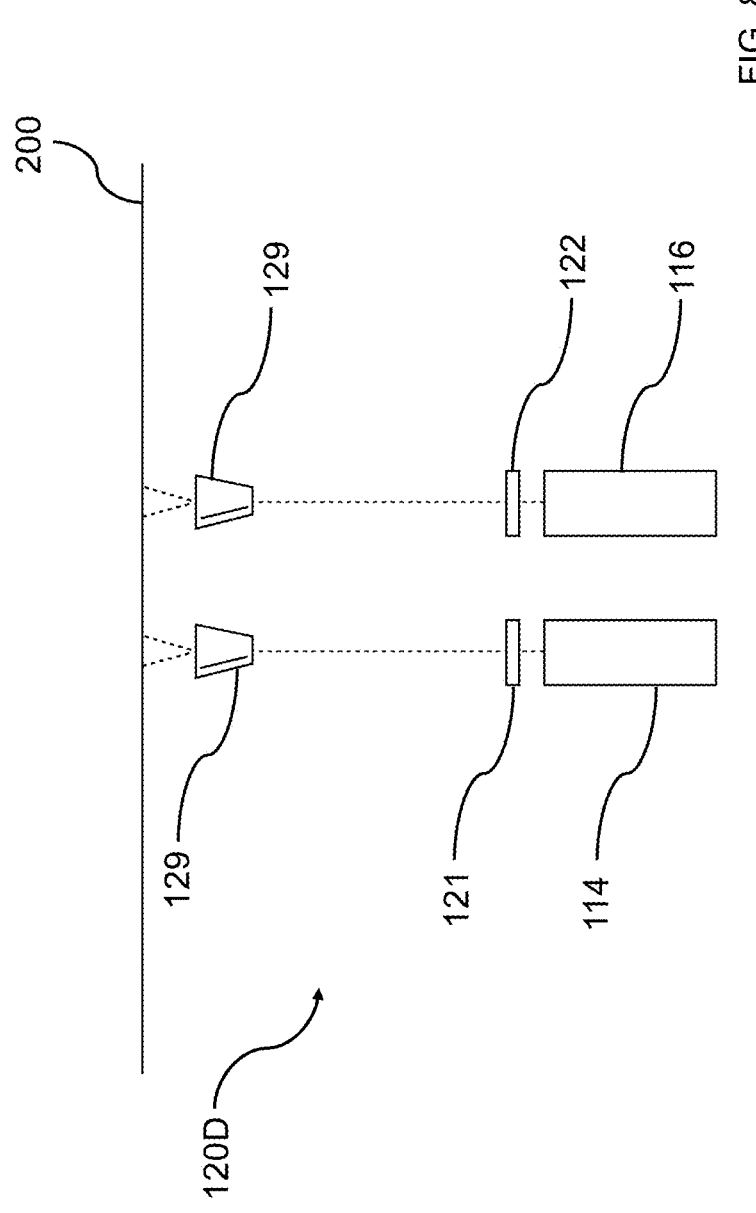
FIG. 8 is simplified diagram depicting an independently adjustable embodiment of an optical path assembly of a dual-wavelength laser emitter, according to aspects of embodiments of the present disclosure.

FIG. 8 is simplified diagram depicting an independently adjustable embodiment of an optical path assembly of a dual-wavelength laser emitter, according to aspects of embodiments of the present disclosure. As depicted, in some embodiments, the optical path assembly may include a first laser 114, a second laser 116, a first beam-width adjuster 121, and a second beam-width adjuster 122, or any combination thereof. In some embodiments, the optical path assembly may also include one or more indicator adjustable focus pattern caps 129. As will be appreciated by one skilled in the art, because the laser beams of the independently adjustable embodiments may be adjusted independently, it may be useful for a user to have one or more indicators such as lines, notches, or other setting markers, configured upon a visible portion of the one or more indicator adjustable focus pattern caps to allow a user to determine what setting the one or more adjustable focus pattern caps have been set to during the set up process. In some embodiments, this may provide a way for a user to match the angular dispersion of the IR laser beam to that of the visible laser beam to facilitate an accurate projection of the desired activation zone during use.

In some embodiments, the indicator adjustable focus pattern caps may alternatively be replaced with one or more adjustable focus pattern caps that do not have indicators, such as the adjustable focus pattern caps 125 of FIG. 6.

In some embodiments, an optical path assembly cover 200 may be included to allow laser light to pass out from the optical assembly while enclosing the optical path assembly to prevent dust and other substances from obstructing the intended operation of the optical path assembly. Any material known by one skilled in the art to be suitable for this purpose may be used within the scope of the present disclosure. This may include, but is not limited to, glass, tempered glass, transparent or tinted plastic compounds, and any combination of such materials including those having one or more layers of different materials.

In still other embodiments, one or more optical waveguides and or one or more fiberoptic cables configured to be operational with the wavelengths of the first laser and the second laser may be used within embodiments of the optical path assembly. As will be understood by one skilled in the art, in such embodiments, the materials used and the sizing of the components may be varied according to the needs of the user. Any combination of waveguides, as would be known to one skilled in the art, and fiber optic cables and cable-splicing components, as would also be known to one skilled in the art to be suitable for this purpose, may be used within the scope of the present disclosure.

iv. Microcontrollers and Circuitry

In some embodiments, the dual-wavelength laser emitters of the present disclosure may include one or more microcontrollers (or "microcontroller units"). Further understanding of the one or more microcontrollers and the corresponding circuitry may be understood by reference to FIG. 5.

As depicted in FIG. 5, a microcontroller 130 may, in some embodiments, be included within the dual-wavelength laser emitter of the present disclosure. In some embodiments, the microcontroller of the present disclosure may include a processing unit 132, a memory 134 (e.g., an EPROM memory, a RAM, or a solid-state memory), and a wireless communications module 136 (e.g., an antenna and associated components, Wi-Fi adapters, Bluetooth adapters, etc.). In some embodiments, the processing unit may be implemented as one or more microprocessors, microcomputers, digital signal processors, central processing units, state machines, logic circuitries, and/or devices that manipulate signals based on operational instructions. Among other capabilities, the processing unit may, in some embodiments, be configured to fetch and execute computer-readable instructions stored in the memory.

As will be understood by one skilled in the art, the computer-readable instructions stored on the memory may, in some embodiments, include instructions configured to cause the microcontroller to operate and/or vary the settings of the first laser and the second laser. This may, in some embodiments, include instructions to operate the first laser so as to emit the IR laser beam in a repeating pattern or sequence. In some such embodiments, the repeating pattern or sequence may be used to allow for the repeating pattern or sequence to be matched with a corresponding setting on a sensor (not depicted) that may allow for the selective activation of the sensor in response to one or more of the repeated patterns or sequences of IR laser beam emissions. Such embodiments are described in more detail below in part D.

In some embodiments, the memory may also store, and the processing unit may be configured to execute, instructions that, when executed by the processing unit, cause it to run a software program that packages and transmits data to and receives data from another electronic device. In some embodiments, the electronic device may be a networked base station. Such embodiments are described in more detail below in part C.

In some embodiments, the microcontroller may include a user interface 138 (also referred to herein as an "input") that may be configured to receive user input or user interactions. In some embodiments, the user interface may include one or more physical buttons/switches, such as an on/off button or other selectable controls.

In some embodiments, the dual-wavelength laser emitter of the present disclosure may also include a battery 139. Any battery as would be known to one skilled in the art may be used within the scope of the present disclosure. The battery may, in some embodiments, be removeable. In some other embodiments, the battery may include one or more replaceable batteries, such as but not limited to AA or AAA size batteries. In some other embodiments, a lithium-ion battery may be used. In some embodiments, one or more batteries may be used. In some other embodiments, the battery may include one or more charging ports to facilitate the recharging of the battery while it is within the dual-wavelength laser emitter. In some other embodiments, the battery may be configured to allow for wireless charging when coupled to a wireless charging station. As will be appreciated by one skilled in the art, any suitable wireless charging technology and/or componentry as would be known to one skilled in the art, may be used for such embodiments within the scope of the present disclosure.

v. Mounts

In some embodiments, as shown in FIGS. 2 and 3, a mount may be used to hold and/or orient the dual-wavelength laser emitter 110 of the present disclosure. In some embodiments, the mount may include a tripod. In some embodiments, the tripod may be configured to have adjustable height and to have a lockable connection to the dual-wavelength laser emitter that facilitates the positioning and orientation of the dual-wavelength laser emitter to be set by a user and maintained during use. Any suitable mounting structure as would be known to one skilled in the art may be used for the mount within the scope of the present disclosure.

B. Sensors and Collar-Mounted Sensors

To facilitate the area denial function of some embodiments of the present disclosure, a sensor may be used. In some embodiments, the sensor may be coupled to or otherwise mounted on a collar that may be configured to be worn by a pet. Such embodiments may be referred to herein as "collar-mounted" sensors. As used herein, a "sensor" may refer to a sensor controller operably coupled to a sensor panel. Further understanding of some embodiments of the sensors and/or collar-mounted sensors may be had by reference to FIGS. 9-11.

Figure 9:
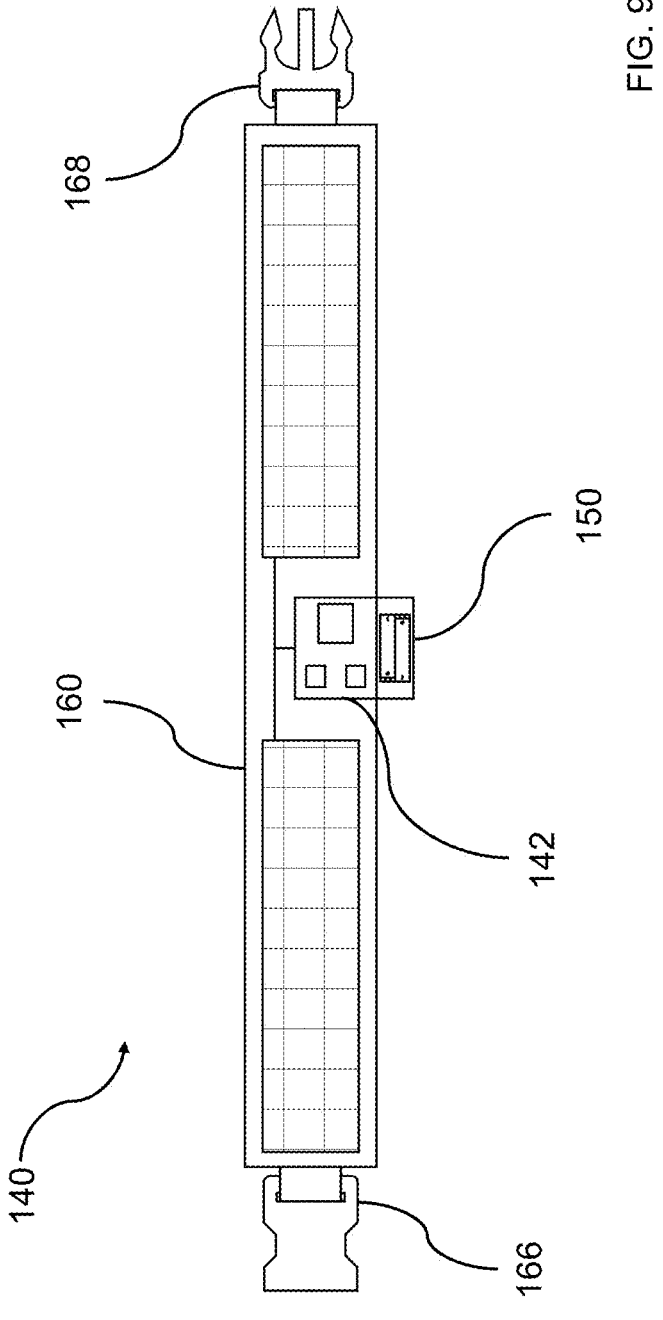
FIG. 9 is a simplified diagram depicting a collar-mounted sensor, according to aspects of embodiments of the present disclosure.

FIG. 9 is a simplified diagram depicting a collar-mounted sensor 140, according to aspects of embodiments of the present disclosure. As depicted, in some embodiments the sensor 142 may be coupled to a battery 150. In some embodiments, the sensor may be mounted to a collar 160 having a first end 166 and a second end 168. As depicted, in some embodiments, the first end 166 and the second end 168 may include one or more locking structures, i.e., clasps, buckles, buttons, etc., configured to facilitate the coupling and retention of the first end to the second end.

Figure 10:
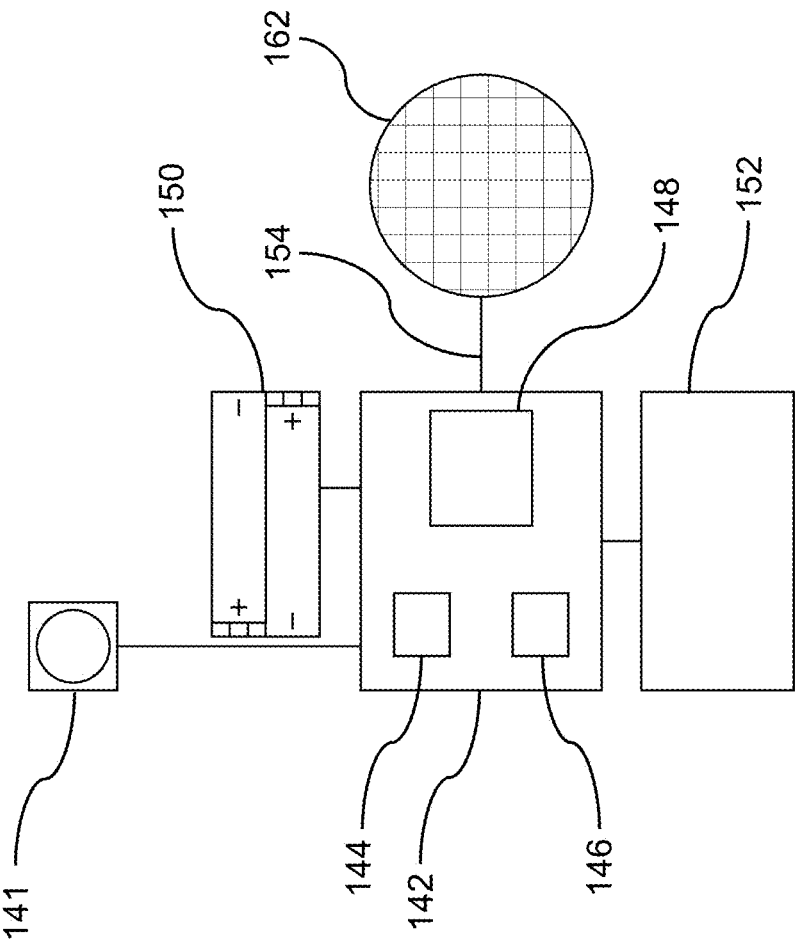
FIG. 10 is a simplified diagram depicting a sensor, according to aspects of embodiments of the present disclosure.

FIG. 10 is a simplified diagram depicting a sensor controller 142, according to aspects of embodiments of the present disclosure. As depicted, in some embodiments, the sensor controller 142 of the present disclosure may include a sensor processing unit 146, a sensor memory 144 (e.g., an EPROM memory, a RAM, or a solid-state memory), and a sensor wireless communications module 148 (e.g., an antenna and associated components, Wi-Fi adapters, Bluetooth adapters, etc.). In some embodiments, the sensor processing unit may be implemented as one or more microprocessors, microcomputers, digital signal processors, central processing units, state machines, logic circuitries, and/or devices that manipulate signals based on operational instructions. Among other capabilities, the sensor processing unit may, in some embodiments, be configured to fetch and execute computer-readable instructions stored in the sensor memory.

As will be understood by one skilled in the art, the computer-readable instructions stored on the sensor memory may, in some embodiments, include instructions configured to cause the sensor microcontroller to respond in response to the detection of an IR laser signal received by a sensor panel 162. In some embodiments, the instructions may, when executed by the sensor processing unit, cause the sensor microcontroller to respond to one or more repeated patterns or sequences of IR laser light being received by the sensor panel. In some such embodiments, the repeating pattern or sequence may be matched or otherwise correlated with a corresponding setting on a dual-wavelength laser emitter (not depicted) that may allow for the selective activation of the sensor in response to one or more of the repeated patterns or sequences of IR laser beam emissions. Such embodiments are described in more detail below in part D.

In some embodiments, the sensor memory may also store, and the sensor processing unit may be configured to execute, instructions that, when executed by the sensor processing unit, cause it to run a software program that packages and transmits data to and receives data from another electronic device. In some embodiments, the electronic device may be a networked base station. Such embodiments are described in more detail below in part C.

In some embodiments, the sensor microcontroller may include a sensor user interface 141 (also referred to herein as a "sensor input") that may be configured to receive user inputs or user interactions. In some embodiments, the sensor user interface may include one or more physical buttons/switches, such as an on/off button or other selectable controls.

In some embodiments, the sensor of the present disclosure may also include a sensor battery 150. Any sensor battery as would be known to one skilled in the art may be used within the scope of the present disclosure. The sensor battery may, in some embodiments, be removeable. In some other embodiments, the sensor battery may include one or more replaceable sensor batteries, such as but not limited to AA or AAA size batteries. In some other embodiments, a lithium-ion sensor battery may be used. In some embodiments, one or more sensor batteries may be used. In some other embodiments, the sensor battery may include one or more charging ports to facilitate the recharging of the sensor battery. In some other embodiments, the sensor battery may be configured to allow for wireless charging when coupled to a wireless charging station. As will be appreciated by one skilled in the art, any suitable wireless charging technology and/or componentry as would be known to one skilled in the art, may be used for such embodiments within the scope of the present disclosure.

In some embodiments, the sensor may include a stimulus module 152. As described above, in some embodiments, the sensor may be configured to have the sensor microcontroller activate the stimulus module in response to an IR laser signal being detected by a sensor panel. The stimulus module may, in some embodiments, include componentry to create a vibration when activated. As will be appreciated by one skilled in the art, there are a variety of different vibration-producing components that may be suitable for use within the stimulus module of the present disclosure, and all such vibration-producing components as would be known to one skilled in the art are within the scope of the present disclosure. This includes, but is not limited to eccentric rotating mass (ERM) motors and/or linear resonant actuators (LRAs) as would be known to one skilled in the art. In some other embodiments, the stimulus module may be configured to deliver an electric stimulus, i.e., a shock, in response to activation by the sensor microcontroller. In some embodiments, the stimulus module may be configured to operate at different intensities of vibration or electric stimulus or to operate in patterned sequences. As described above, in some such embodiments, those modes of operation may be controlled by instructions executed by the sensor processing unit of the sensor microcontroller.

In some embodiments, a connector 154 may be used to communicably link a sensor panel to a sensor. Any suitable connecting structure as would be known to one skilled in the art, including conductive wires, flexible traces and circuits, etc., may be used within the scope of the present disclosure. In some embodiments, the sensor panel may have a female-type input that may be configured to connect to a male-type output of the connector.

As will be appreciated by one skilled in the art, the various sizes and fur types that pets may have may require the use of different sensor panels to ensure that IR laser signals are correctly received by the sensor when mounted on a collar and worn by a pet. Further understanding of embodiments of the sensor panel may be had by reference to FIG. 11.

Figure 11:
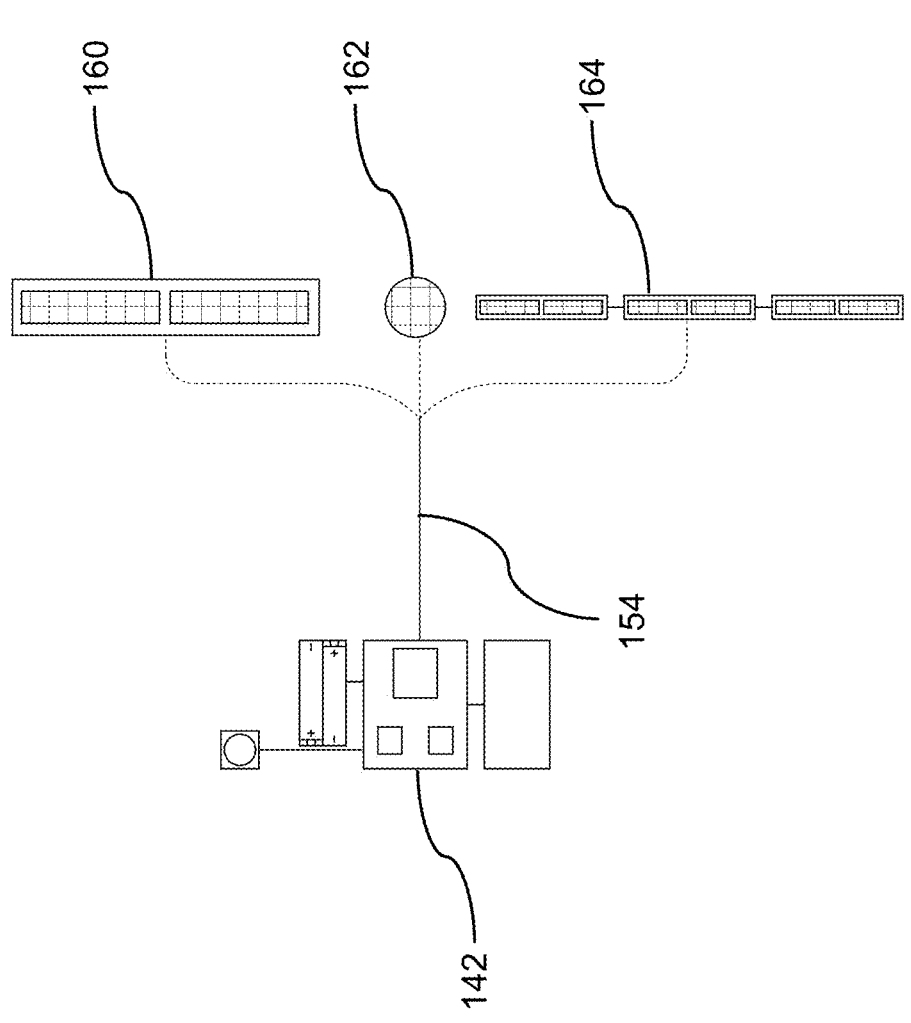
FIG. 11 is a simplified diagram depicting alternative embodiments of a sensor panel that may be connected to a sensor, according to aspects of embodiments of the present disclosure.

FIG. 11 is a simplified diagram depicting alternative embodiments of sensor panels that may be connected to a sensor, according to aspects of embodiments of the present disclosure. As shown, in some embodiments, a sensor panel may be a tag sensor panel 162. In some embodiments, the sensor panel may be a two-band sensor panel 160. In some other embodiments, the sensor panel may be a three-band sensor panel 164. As will be appreciated by one skilled in the art, the number of bands used may be varied according to the size of the collar required to fit properly about the neck of a pet.

The sensor panel, including the various different shapes such as the tag, two-band, and three-band embodiments, may include one or more arrays of photodiodes to detect a signal from the IR laser beam of the dual-wavelength laser emitter of the present disclosure. In some such embodiments, the photodiodes of the photodiode arrays may be InGaAs (Indium Gallium Arsenide) photodiodes. All suitable devices for detecting IR light signals as would be known to one skilled in the art may be used within the scope of the present disclosure. In some embodiments, the photodiode arrays may be connected serially or may be connected in parallel.

C. App-Enabled Embodiments

As described above, in some embodiments, the laser-based area denial system of the present disclosure may include a wireless communication module within a dual-wavelength laser emitter and/or a sensor wireless communication module within the sensor microcontroller that may be configured to wirelessly communicate over a network with a networked base station. As will be appreciated by one skilled in the art, any suitable wireless communication/network standard may be used to facilitate the wireless connection of these components within the scope of the present disclosure. Non-limiting examples of these standards may include Wi-Fi, Bluetooth and Bluetooth Low Energy (BLE), and near-field communication (NFC).

In some embodiments, the networked base station may be configured to receive status information and/or activation event information from one or more connected dual-wavelength laser emitters and/or sensors. In some embodiments, the activation event information may include dates, times, intensities, and other information such as unique pet identifier sequence numbers to help track how pets are interacting with the laser-based area denial system of the present disclosure. In some embodiments, the networked base station may be configured to turn on/off or set the dual-wavelength laser emitters and/or sensors of the present disclosure into a low power consumption "sleep" mode.

In some embodiments, the networked base station may be configured to wirelessly connect to the internet and send data from the laser-based area denial system to a remote or cloud-based server or server network (170 of FIG. 1). This may, in some embodiments, allow for the laser-based area denial system to record data in a remote database that may be accessed by a software application such as a mobile application on a smart phone or tablet computing device. Such embodiments may be referred to herein as "app-connected" embodiments. The app-connected embodiments of the present disclosure may allow a user to track how his or her pet is interacting with the laser-based area denial system, remotely operate the system, and, in some embodiments, get a communication or a notification from the software application about an activation event being recorded by the system.

In some embodiments, the remote or cloud-based sever may be configured to store information received from one or more wireless base stations corresponding to one or more app-enabled laser-based area-denial systems of the present disclosure. The database may use any structure as would be known to be suitable for this purpose by one skilled in the art. As non-limiting examples, this may include SQL database structures and non-SQL database structures. In some embodiments, a relational database structure may be used to relate specific information corresponding to activation events for a pet to a record in the database corresponding to the pet owner or a profile of the pet owner. This may, in some embodiments, allow for a software application, such as a remote application run on a smart phone or other computing device, to conveniently access and organize activation event data by pet and owner.

In some embodiments, the wireless base station may be configured to receive instructions from a remote computing device or smart phone running an application that allows for a user to program the instructions stored in the memory and/or the sensor memory of one or more dual-wavelength laser emitter and/or sensors of the present disclosure to determine how these components are configured to operate. Some such embodiments may allow for "multi-pet" use as described in further detail below.

D. Multi-Pet Embodiments

Some users may have more than one pets, and there may be a need/desire to have the pets be allowed into different areas. For example, a user could own a cat and a dog and want to have different areas where each pet is denied access.

In some embodiments, this may be accomplished by allowing the dual-wavelength laser emitters of the system to be programmed to emit different repeating patterns or sequences of IR laser emissions and correspondingly configuring the sensors of the system to be activated in response to user-specified signal patterns that may be correlated to different pets. As a non-limiting example, if a user wishes to have his cat allowed through a doorway but wishes to prevent his dog from passing through the doorway, he could position a dual-wavelength laser emitter to shine an activation zone across the floor in the doorway. The dual-wavelength laser emitter could then be programmed to emit the IR laser beam in a 10 hz repeating series of pulses over a 0.5 second interval. The sensor on the dog's collar could then be programmed to activate in response to detection of that sequence of pulses over the 0.5 second signal duration and programmed not to respond to any other sequence of pulses. Conversely, the sensor on the cat's collar could be programmed to only respond to 100 hz pulses over a 0.5 second interval. In such a scenario, the dog would receive a deterrent stimulus when attempting to pass through the activation zone, but the cat would not.

As will be appreciated by one skilled in the art, there are a large variety of suitable patterns, frequencies, and signal durations that may be used within the scope of the present disclosure. In some ways, the multi-pet embodiments may be considered as having the dual-wavelength laser emitters and collars configured to send and receive, respectively, signals that correspond to individual pets. The specific pattern and signal duration assigned to each pet being like the system's identifier for the pet. Different dual-wavelength laser emitters may be configured to emit the signals corresponding to different pets within the system. In some embodiments, the dual-wavelength laser emitters may be configured to emit IR laser signals that correspond to different pets in a repeating sequence. As another non-limiting example, this may allow for a set of pets (A, B, and C) each having a unique sequence assigned to them within the system, to have pets A and B denied by an activation zone that has the sequences for A and B repeatedly shone by a dual-wavelength laser emitter while pet C's sequence is not emitted and thus pet C may enter the activation zone without receiving a deterrent stimulus.

In some embodiments, the sequences and assigning of sequences to different collars may be controlled through a remote software application run by a smart phone, tablet computing device, or other computing device. That is, a multi-pet embodiment of the system may also be an app-connected embodiment, wherein the app-connected system may receive instructions from a user via the software application that controls the multi-pet operation of the system.

E. Remote Control Embodiments

In some embodiments of the laser-based area denial system of the present disclosure, a user may operate a remote control to directly shone an IR light on a pet causing the activation of a stimulus unit of a sensor. This may allow for a user to train or otherwise provide a deterrent stimulus to a pet independent of the pet being in an activation zone projected by a dual-wavelength laser emitter. Further understanding of these embodiments may be had by reference to FIG. 12.

Figure 12:
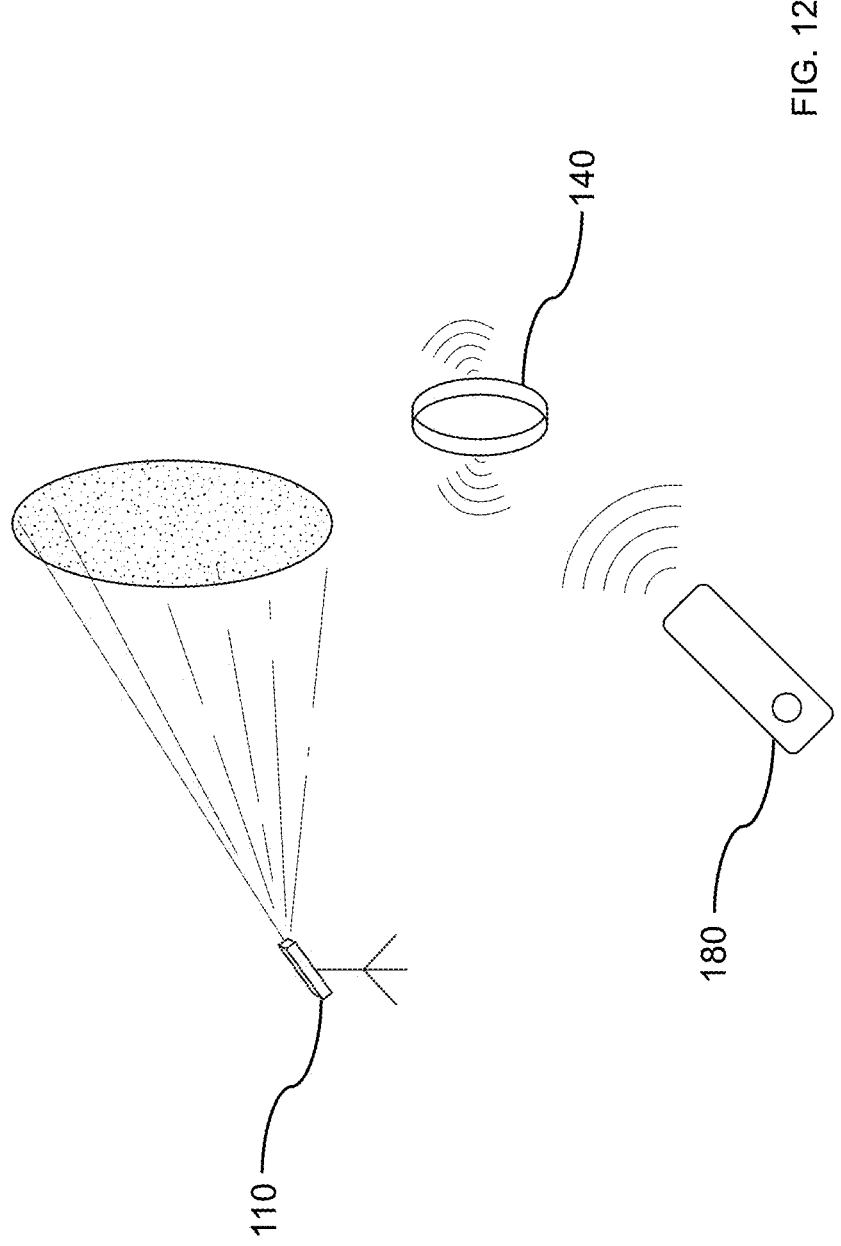
FIG. 12 is a simplified perspective view of a collar-mounted sensor being activated by a remote control while outside of a laser-based denial area, according to aspects of embodiments of the present disclosure.

FIG. 12 is a simplified perspective view of a collar-mounted sensor being activated by a remote control while outside of a laser-based denial area, according to aspects of embodiments of the present disclosure. As shown a remote control 180 may be used to project an IR light or laser beam, including a laser beam or light cone projected in a sequence as described above, at a collar-mounted sensor to activate it to produce a deterrent stimulus while the sensor is otherwise outside of an activation zone.

It will be understood that embodiments described herein should be considered in a descriptive sense only and not for purposes of limitation. Descriptions of features or aspects within each exemplary embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope as defined by the following claim. It should be noted that although examples of the invention are set forth herein, the claims, and the full scope of any equivalents, are what define the metes and bounds of the invention.

What is claimed is:

1. A focus-adjustable laser-based area-denial system, comprising:
   a dual-wavelength laser emitter comprising:
      a first laser configured to emit a first laser beam having a wavelength in the Infrared range;
      a second laser configured to emit a second laser beam having a wavelength in the visible range;
      a microcontroller having a processing unit, a memory, and a wireless communications module configured to control the first laser and the second laser; and
      an optical path assembly; and
   a collar-mounted sensor comprising:
      a collar; and
   a sensor-controller configured to couple to the collar and having a sensor processing unit, a sensor memory, a sensor wireless communications module, and a stimulus module configured to be controlled by the sensor processing unit and deliver a deterrent stimulus in response to the first laser beam;
      wherein the optical path assembly is a slide-adjustable optical path assembly.

2. A focus-adjustable laser-based area-denial system, comprising:
   a dual-wavelength laser emitter comprising:
      a first laser configured to emit a first laser beam having a wavelength in the Infrared range;
      a second laser configured to emit a second laser beam having a wavelength in the visible range;
      a microcontroller having a processing unit, a memory, and a wireless communications module configured to control the first laser and the second laser; and
      an optical path assembly; and
   a collar-mounted sensor comprising:
      a collar; and
   a sensor-controller configured to couple to the collar and having a sensor processing unit, a sensor memory, a sensor wireless communications module, and a stimulus module configured to be controlled by the sensor processing unit and deliver a deterrent stimulus in response to the first laser beam;
      wherein the optical path assembly is a flip-adjustable optical path assembly.

3. A focus-adjustable laser-based area-denial system, comprising:
   a dual-wavelength laser emitter comprising:
      a first laser configured to emit a first laser beam having a wavelength in the Infrared range;
      a second laser configured to emit a second laser beam having a wavelength in the visible range;
      a microcontroller having a processing unit, a memory, and a wireless communications module configured to control the first laser and the second laser; and
      an optical path assembly; and
   a collar-mounted sensor comprising:
      a collar; and
   a sensor-controller configured to couple to the collar and having a sensor processing unit, a sensor memory, a sensor wireless communications module, and a stimulus module configured to be controlled by the sensor processing unit and deliver a deterrent stimulus in response to the first laser beam;

wherein the optical path assembly is an independently adjustable optical path assembly.

* * * * *